Figure 1:
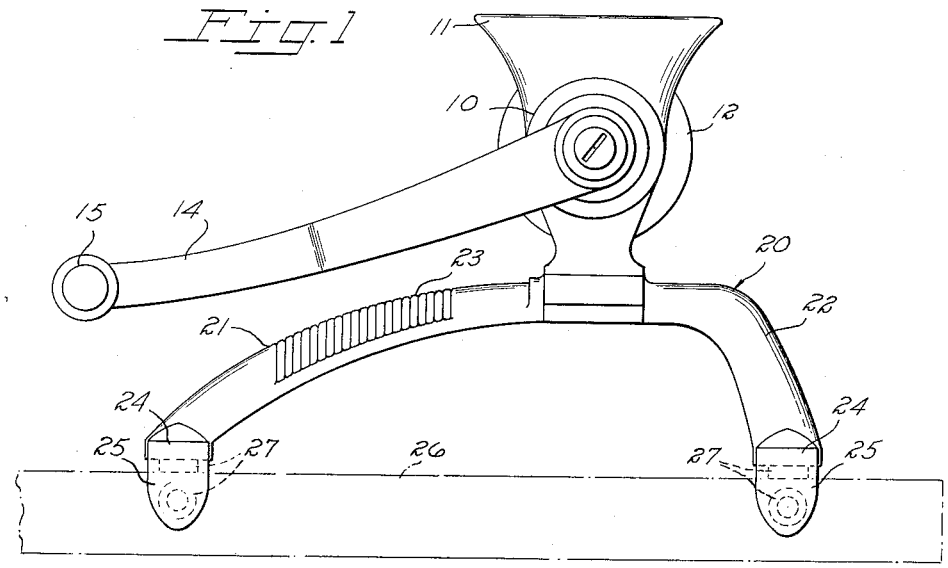

Feb. 14, 1956 — W. J. RUSSELL — 2,734,539

FOOD CHOPPER AND BASE THEREFOR

Filed Aug. 18, 1950

Inventor
WILLIAM J. RUSSELL
By
Lindsey and Prutzman
Attorneys

United States Patent Office 2,734,539
Patented Feb. 14, 1956

2,734,539

FOOD CHOPPER AND BASE THEREFOR

William J. Russell, New Britain, Conn., assignor to Landers, Frary and Clark, New Britain, Conn., a corporation of Connecticut Application August 18, 1950, Serial No. 180,166

3 Claims. (Cl. 146—182)

The present invention relates to food choppers, and more particularly to a food chopper having a novel type of supporting means whereby the same may be immovably positioned on a supporting surface such as a table or counter, or the like, without the need for using any clamps or similar fastening devices.

The present invention has particular utility in connection with food choppers of the manually operated type commonly used in household kitchens. Such a food chopper is usually provided with a crank which is rotated by the operator, and the operation is such that the device is subjected to non-uniform forces applied in varying directions. Normally the operation of such food choppers is impossible unless the base of the chopper is clamped to a table top or similar supporting surface whereby movement of the device in any direction is effectively prevented. It has been found, however, that many modern kitchens do not have counters or tables constructed with overhanging tops providing a projection on which the food chopper can be clamped. In any event, the clamping and unclamping of the base on a table or counter is a time-wasting and inconvenient operation which many housewives find difficult to carry out. Also the use of conventional attaching means such as clamps or the like frequently causes marring and deformation of the edge portions of the supporting surface, rendering the same unsightly in appearance.

The principal aim of the present invention is to provide a food chopper having a base of simple and economical construction which is effective to permit the food chopper to be easily held in fixed position on a supporting surface without the need for any clamps or other fastening devices.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 2:
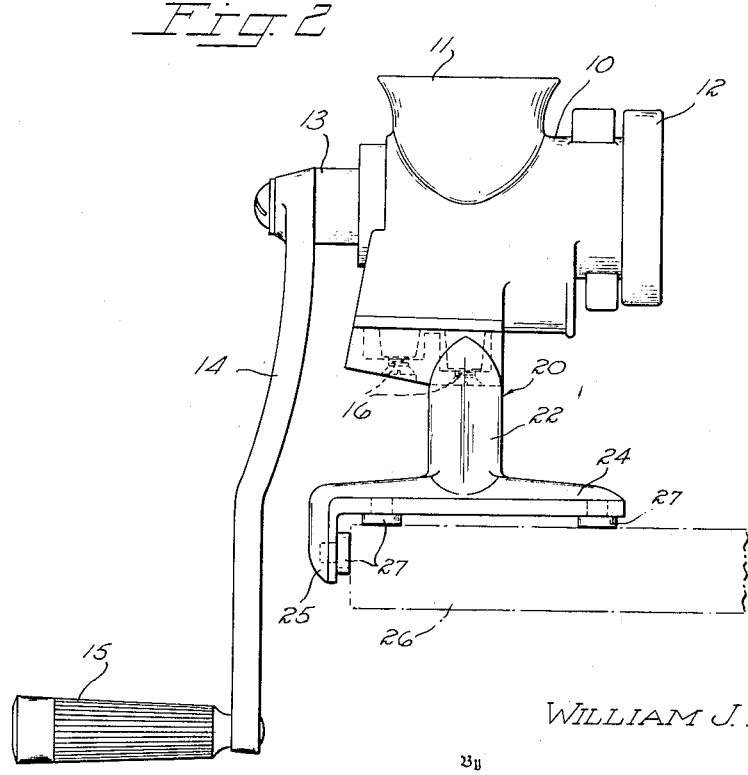

In the drawings:

Figure 1 is a side view of a food chopper having a base constructed in accordance with the present invention; and Fig. 2 is an end view thereof.

Referring to the drawings, the food chopper of the present invention comprises a housing 10 formed with the usual food receiving hopper 11 and provided at its forward end with a cutting instrument generally denoted at 12, the cutting instrument 12 being connected to a transverse shaft 13 provided with the usual worm feed (not shown) extending within the housing 10 for the purpose of feeding the food from the hopper 11 to the cutting instrument 12.

Secured to the end of the shaft 13 is a conventional manually operated crank 14 having a suitable handle 15, it being understood that the chopper is operated by turning the crank 14 about the axis of the shaft 13.

In the preferred embodiment shown in the drawings, the housing 10 of the food chopper is made separable from the base portion to be described hereinafter and secured in place by bolts 16, although it will be readily appreciated that these elements could be made integrally, if desired.

In accordance with the invention, the base of the food chopper consists essentially of a bowed or arched base member 20 which is characterized particularly by a gradually curved handle portion 21 and a more sharply curved supporting portion 22. In the preferred embodiment, the handle portion 21 is generally tubular in construction but preferably non-circular in cross section, and suitably knurled or otherwise arranged as at 23 to permit the same to be securely grasped by the left hand of the operator. The base member 20 extends generally transversely to the axis of the chopper, i. e. the shaft 13.

The lower extremities of the handle portion 21 and supporting portion 22 of the base member 20 are secured to transverse supporting plates 24, preferably formed integrally therewith. The transverse supporting plates 24 lie in the same plane so as to be disposed on a table top or other supporting surface and are formed with a depending flange 25 adapted to extend around the edge of the supporting member, indicated generally by dot and dash lines 26. In order to avoid marring of the supporting member and also to avoid slippage longitudinally of the table edge, the transverse plates 24 and the depending flange 25 may be provided with buttons 27 formed of suitable resilient material having a high coefficient of friction, such as rubber, for contacting the surface.

When the food chopper is placed in operation, the base 20 is disposed on the supporting surface 26 in the manner shown in the drawings, i. e. with the depending flange 25 of both supporting plates 24 engaging the edge of the supporting surface. The operator then grasps the handle portion 21, preferably at the knurled portion 23, and places thereon a force which is downwardly and inwardly directed with respect to the supporting surface. When so operated, it has been found that twisting of the base is effectively prevented in all directions, it being apparent that the legs of the base 20 are sufficiently widespread so that a moderate amount of force on the handle portion 21 will prevent the base from pivoting around either of the transverse supporting plate flanges. At the same time, tilting of the base transversely to the edge of the supporting surface is effectively prevented by the transverse supporting plates 24, it being found that the forces tending to tilt the food chopper in this direction are relatively small. Sliding movement of the base is effectively prevented by the engagement of the flange portions 25 with the edge of the supporting surface taken together with the direction of the force applied by the operator to the handle 21, it being realized that the operator can readily apply sufficient force to prevent the device from sliding outwardly from the supporting surface, particularly since the flanges 25 prevent the device from sliding inwardly of the supporting surface regardless of the amount of pressure applied to the handle 21 by the operator. The friction buttons 27 further prevent sliding movement of the base.

It thus will be seen that a food chopper has been provided, in accordance with the invention, with a base which will remain in fixed position on a supporting surface such as a table top or counter, even though grasped by only one hand of the operator, and the food chopper can be used as effectively as though the usual clamping devices were employed. At the same time, the base will not mar the supporting surface or edge thereof in any way, the food chopper can be quickly and easily placed into operation merely by seating it in position on the supporting surface without the need for turning or adjusting any associated clamping means, and at the complettion of the use of the chopper, the same may be removed merely by lifting the same from the table or counter, there being nothing to unfasten or release.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A base for a food chopper comprising a pair of parallel elongated supporting plates for disposition on the top of a supporting member, each of said plates being provided with a depending flange at one end for engaging the edge of the supporting member, resilient members having a high coefficient of friction disposed on the bottom surfaces of the plates and on the inner faces of the flanges, a convexly curved, generally tubular support fixed to the plates and extending in an arch transversely between the plates, said tubular support forming a pair of legs for the food chopper and having one of said legs more gradually curved than the other to form an upwardly facing handle portion.

2. In a food chopper of the type having a housing provided at its lower end with a rotatable cutter operated by a crank, the combination with said housing of an elongated base adapted to be placed on a supporting surface, the base extending transversely of the axis of the cutter beyond the periphery of the housing to restrain tipping of the chopper in a radical direction and having a wide portion to restrain tipping in an axial direction, and means for holdng the base in a stationary position during use of the chopper comprising an elevated upwardly facing handle portion on the base adapted to be grasped by the operator and depending means on one lateral edge of the base forming an abutment for engaging against the edge of the supporting surface on opposite sides of the axis of the chopper.

3. In a food chopper of the type having a housing provided with a rotatable cutter operated by a hand crank, the combination with said housing of a pair of longitudinally spaced supporting plates having coplanar flat bottom surfaces adapted to be set on a supporting member, a generally tubular convexly arched support connected at its ends to said supporting plates and adapted to support the housing at its crest, an upwardly facing handle portion on said tubular support intermediate its crest and one end thereof, and a downwardly extending flange on one end of each of said plates, said flanges having coplanar flat inside surfaces.

References Cited in the file of this patent

UNITED STATES PATENTS

| | | |
|---|---|---|
| D. 157,553 | Wormeck | Feb. 28, 1950 |
| D. 162,997 | Talge | Apr. 17, 1951 |
| 422,644 | Shephard | Mar. 4, 1890 |
| 706,881 | Barr | Aug. 12, 1902 |
| 759,647 | Updegroff | May 10, 1904 |
| 1,192,112 | Porter | July 25, 1916 |
| 1,520,615 | Thompson | Dec. 23, 1924 |
| 1,660,648 | Linstrom | Feb. 28, 1928 |
| 1,918,186 | Juengst et al. | July 11, 1933 |

FOREIGN PATENTS

| | | |
|---|---|---|
| 7,985 | Great Britain | 1888 |